July 16, 1968   T. BARISH   3,393,027

COMBINATION BALL AND ROLLER BEARING

Filed March 15, 1965

INVENTOR
THOMAS BARISH
BY *Hoffmann and Yount*
ATTORNEY

United States Patent Office 3,393,027
Patented July 16, 1968

3,393,027
COMBINATION BALL AND ROLLER BEARING
Thomas Barish, 3210 Warrensville Center Road,
Cleveland, Ohio 44122
Filed Mar. 15, 1965, Ser. No. 439,766
8 Claims. (Cl. 308—174)

ABSTRACT OF THE DISCLOSURE

A combination roller and ball bearing structure, particularly suitable for heavy load bearing and requiring a diameter of three feet or more, is shown comprising two concentric ring-shaped unitary bearing members arranged to provide a roller bearing race for axial loads and a ball bearing race for lateral or tilting loads. The outer bearing member has a skirt portion integral therewith and the inner bearing member is adapted to be received in the skirt. The inner and outer bearing members have planar surfaces normal to the axis of the members and are disposed to form a race for roller bearings which support axial loads. The interior of the skirt and the circular exterior of the inner bearing member each has an annular groove and which grooves cooperate to form a roller bearing race for ball bearings which bear tilting and lateral loadings. The ball bearings may be assembled in their race by insertion into the space between the grooves through an opening provided by a relieved wall edge of the groove on the inner bearing and the walls of the groove in the skirt when the inner member is shifted in the skirt. In one instance, the inner member is shifted axially towards the inner end of the skirt prior to insertion of the roller bearing into their race to move the relieved side wall of the groove opposite the open side of the groove in the skirt to thereby provide an opening to receive the ball bearings and in another instance the inner bearing member is shifted laterally of the axis of rotation of the bearing to provide a gap between the relieved groove wall and the walls of the groove in the skirt.

---

The present invention relates to combination ball and roller bearings including methods of manufacturing and/or assembling such bearing and more particularly to such bearings suitable for supporting heavy axial or thrust loads and lesser radial loads, reverse axial loads and overturning moments.

The invention contemplates the provision of a new and improved combination ball and roller bearings particularly suitable for relatively large diameter applications for supporting heavy axial thrusts or loads with occasional reverse axial and radial thrusts as well as overturning moments, and which comprises two unitary rings each of simple, rigid form and each providing one race for the rollers and one race for the balls.

One of the principal objects of the invention is the provision of a novel and improved combination ball and roller bearing and method of making the same comprising two co-axially disposed members with confronting radially extending flat or planar annular faces between which rollers are disposed in radial array and which are capable of supporting considerable loading normal to the annular faces, that is, in the direction of the axis of the bearing and two cooperating annular ball races in a plane normal to the axis of the bearing comprising grooves substantially semicircular in transverse section providing ball bearing surfaces or raceways generally arcuate in cross-section with ball bearings therebetween for taking radial thrust or loads and thrust or loads a direction opposite to the direction of the main thrust or load and overturning or tilting thrust or loads.

Another object of the invention is the provision of a combination roller and ball bearing of the character referred to in which the shoulder of the inner ball race opposite the rollers is relieved or cut away sufficient to allow the balls to be inserted between the ball races.

A further object of the invention is the provision of a novel and improved method of forming a combination roller and ball bearing of the type mentioned in which the members having the roller and ball races are placed in a concentric position with the annular radially extending flat faces or roller races adjacent one another whereby space is provided for inserting the balls with or without their cage between the members, with the balls positioned in the outer ball race, raising the inner member to confine the balls between the ball races of the members, then inserting the rollers radially between the radially extending annular faces or races of the members and securing the rollers in a cage structure.

Still another object of the invention is the provision of a novel and improved method of manufacturing combination roller and ball bearing of the type mentioned which comprises placing the rollers retained in a cage structure on the flat annular race of one of the bearing members, placing the other bearing member with the flat annular race on the rollers, positioning the members laterally relative to one another to form a ball receiving opening between the two members, inserting balls between the grooves of the members and returning the members to their co-axial position to confine the balls between their races.

The invention resides on certain construction and arrangement of parts and methods of assembling the parts and other objects and advantages of the invention will be apparent from the following description of a preferred embodiment thereof, reference being made to the accompanying drawings wherein:

FIG. 1 is a fragmentary sectional view of a combination roller and ball bearing embodying the present invention particularly suited for supporting a radar screen and the like;

Figure 1:
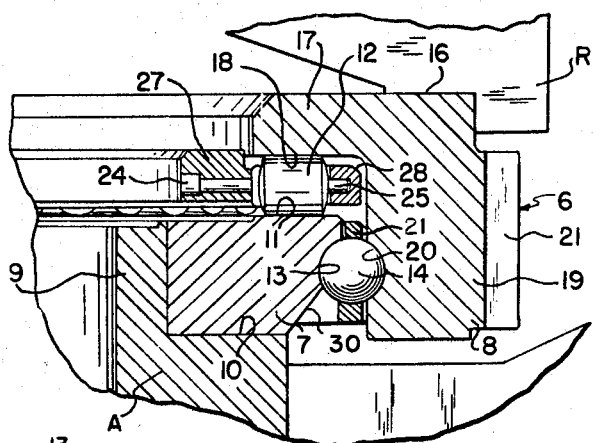

The bearing of the present invention is well suited for uses requiring large diameter bearings such as three feet to twenty feet and more as in supporting structures for radar screens and the invention is illustrated as embodied in a bearing forming part of a radar screen support. The base or stationary structure is designated A and rotatably supports a radar screen R. It is to be understood, however, the bearing can be used for supporting any other type of load or thrust.

In the form of the invention shown, the bearing proper is designated generally as 6 and comprises two concentric rings 7 and 8, the inner ring 7 of which is fixedly secured on a tubular boss 9 of base A projecting upwardly from an annular surface or shoulder 10 extending radially from the base of the boss. The top side of the ring 7 has a radially extending flat annular surface or face 11 formed thereon and which forms a race for a series of rollers 12. The outside of ring 7 adjacent surface 11 is cylindrical and adjoins a groove 13 formed about the ring in a plane normal to the axis of the bearing. The groove 13 is arcuate in transverse cross-section and forms the inside race for balls 14.

The outer ring 8 has an annular radially extending surface or face 16 on which the radar screen R rests and to which it is secured in a suitable manner, not shown.

The ring 8 has an inwardly projecting flange or section 17 on which a flat, annular, radially extending surface or face 18 extending in a plane normal to the axis of the bearing. The face 18 which faces the race 11 of ring 7 forms the upper or second race for the rollers 12. The ring 8 also has an axially extending cylindrical section or skirt 19 which surrounds ring 7 and the inner side of which has an inwardly facing groove 20 formed thereabout which is substantially semicircular in transverse cross-section and is in a plane normal to the axis of the bearing. The groove 20 forms the second or outer race for the balls 14 of the bearing. A series of balls 14 are positioned between the grooves 12, 20 and are maintained in spaced relationship with respect to one another by a keeper ring or cage 21, which may be of any suitable well known construction. The outer periphery of ring 8 is provided with gear teeth 21 by which the race is driven by a pinion, not shown, to rotate the ring and the radar screen R carried thereon.

The rollers 12 are positioned between the planar races 11, 18 and the rollers have end stems or axles 24 and 25 which are received in journals in inner and outer cage rings 27 and 28, respectively, so that the rollers are maintained in a radial array and in a predetermined spaced relationship. It will be seen that by the construction described the load capacity of the rollers 12 between the annular flat races is exceedingly high and that the unitary form of each ring provides maximum rigidity to the bearing races.

As shown in the drawings, the annular shoulder of the inner ball race or groove opposite the annular planar roller race 11 is relieved or cut away for a purpose hereinafter referred to so as to provide a ball bearing race surface which is arcuate in transverse cross-sectional form with a line bisecting the arc intersecting the axis of the bearing at an angle somewhat less than 90°. In the bearing shown this angle is about 55°. The relief shown provides a frusto-conical surface 30 at the lower side of the interior ball race 13 as viewed in FIG. 1. The construction of the race 13 provides a supporting surface for the balls 14 having a maximum load supporting capacity for overturning moments and also provides considerable support for the balls to counter axial thrusts in a direction opposite to the thrust provided by the load of the screen R. Annular groove or ball race 20 is of the usual construction and presents a ball bearing race arcuate in transverse cross-sectional form with a line bisecting the arc extending normal to the axis of the bearing. This, however, is not necessary so long as sufficient race surface is provided for the balls to carry the loads imposed upon the bearing.

Figure 2:
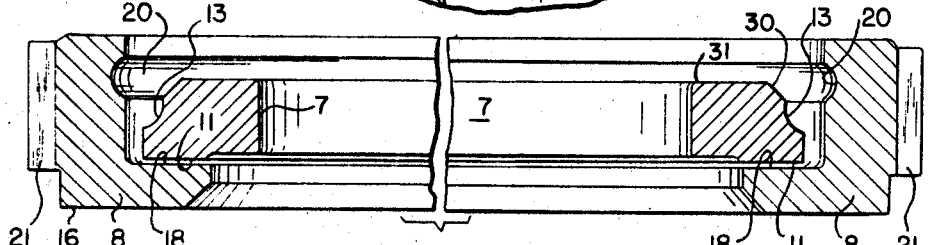
FIG. 2 is a sectional view of the two rings of the combination roller and ball bearing shown in FIG. 1 in an initial assembly position.
Figure 3:
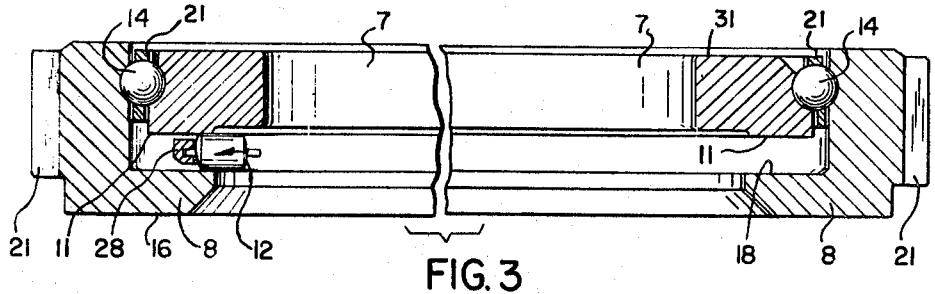
FIG. 3 is a sectional view similar to FIG. 2 but showing the bearing in an advanced assembly stage; and, FIG. 4 is a sectional view of the combination roller and ball bearing showing a step in the assembly thereof employing a different method of assembling the bearing.

The combination roller bearing and ball bearing structure shown may be assembled as illustrated in FIGS. 2 and 3 in which the rollers and balls and their races are omitted, the rings 7, 8 inverted from their positions shown in FIG. 1, and the inside ring 7 rests upon ring 8 with the race surface 11 engaging the race surface 18. In this position space is provided between the members 7 and 8 to permit the balls 14 while retained in their cage 21 to be inserted between the two members by reason of the space provided by the relieved upper shoulder of the inner ball race 13. While in the embodiment shown the relief provides a frusto-conical surface 30 between the ball race 13 and the upper face 31 of the member 7, as viewed in FIGS. 2 to 4, any other suitable form of relief can be provided so long as the upper shoulder of the cut away is enough to provide sufficient clearance to allow the parts to be assembled in the proposed manner after the ball bearings 14 including their race 21 are positioned between the members 7 and 8 with the balls engaged in the outer ball race 20 the ring or member 7 is raised to the position seen in FIG. 3 in which position the rollers 12 are then inserted radially between the race surfacess 11 and 18, as indicated by the arrow 31 in FIG. 3. The cage members 27 and 28 can be inserted in segments as the rollers are inserted into position between their races and the segments of cage member 28 subsequently bolted together to maintain the rollers in position.

Figure 4:
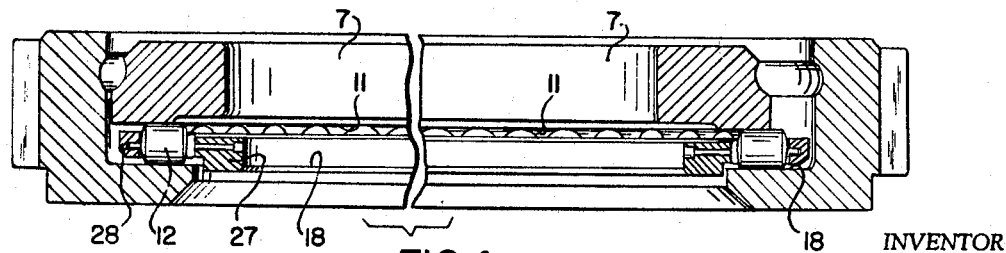

FIG. 4 discloses an alternate method of assembling the combination roller and ball bearing. In this method the ring 8 is inverted from the position shown in FIG. 1 and rollers 12 assembled in and their cages 27, 28 placed upon the race surface 18. Ring 7 is then placed on top of the rollers 12 within skirt 19 and moved radially to one side so as to form an opening between the ring 7 and the opposite side of the skirt through which the balls 14 can be inserted between races 13 and 20. After all of the balls which can be inserted between the races 13 and 20 have been inserted, the balls are spaced equidistant about the races and a suitable cage structure, not shown, for the balls inserted and secured in place. The ball cage may be of the one piece type having spring fingers which are snapped over the balls to retain them in position or finger portions which are bent over the balls. The particular construction of the cage for the balls is not of importance to the present invention.

If it is desired to have a maximum number of balls in the bearings shown in FIG. 4, a groove can be provided preferably in the member 8 through which the balls can be inserted after which groove is closed. With this method of assembly it will be obvious that the upper shoulder of the race 13, referring to the position of the parts as shown in FIG. 4, need not be relieved. Obviously, the same construction, that is, a small opening in the upper shoulder of one or both ball races of the members 7 and 8 could be substituted for or used in place of the shown annular relief of the upper shoulder of the race 13, with the first-mentioned method of assembly illustrated in FIGS. 2 and 3.

It will be seen that the invention provides a bearing of relatively simple and rigid construction and one which has an exceedingly high load capacity in an axial direction provided by the rollers 12 and considerable capacity for radial loads provided by the balls 14. The balls 14 likewise effectively support tilting thrusts and reverse axial thrusts by reason of their disposition between their races.

From the foregoing it is believed that the objects heretofore mentioned and others have been accomplished and that there has been provided a novel and improved combination roller and ball bearing of the type referred to as well as novel and improved methods of manufacturing and/or assembling the same. Although several forms of the invention have been disclosed it will be apparent that other forms, modifications and adaptations thereof may be made, all falling within the scope of the invention as defined in the claims which follow.

Having described my invention, I claim:

1. In a combination ball and roller bearing comprising two members one rotatable relative to the other about a common axis, one member having a circular section the center of which coincides with said common axis, an annular circumferential groove about said circular section and lying in a plane normal to said axis, said circular section having an axial facing planar surface disposed normal to said axis, said other bearing member having an axially facing planar surface disposed normal to said axis and facing the first-mentioned planar surface to form therewith a roller bearing race and a skirt portion formed integral therewith and surrounding said circular section and spaced radially therefrom, said skirt portion having an annular groove about the interior thereof and lying in a plane normal to said axis and adapted to cooperate with said groove in said circular section to form a ball bearing race, the diameter of said one section being less than the inside diameter of said skirt portion whereby said circular section may be inserted into said skirt portion to insert a plurality of ball bearings in said race formed by said annular grooves and a plurality of roller bearings between said axially facing planar surfaces.

2. In a combination ball and roller bearing comprising two members one rotatable relative to the other about a common axis, one member having a circular section the center of which coincides with said common axis, an annular circumferential groove about said circular section and lying in a plane normal to said axis, said circular section having an axially facing planar surface disposed normal to said axis, at least a portion of the side wall of said annular groove remote from said planar surface being of reduced diameter relative to the opposite side wall of said groove, said other bearing member having an axially facing planar surface disposed normal to said axis and facing the first-mentioned planar surface to cooperate therewith and form a roller bearing race and an open end skirt portion formed integral with said other bearing member and surrounding said circular section and space radially therefrom, said skirt portion having an annular groove about the interior thereof and lying in a plane normal to said axis and adapted to cooperate with said groove in said circular section to form a ball bearing race, the diameter of said one section being less than the inside diameter of said skirt whereby said circular section may be inserted into said skirt for forming said roller and ball bearing races, a plurality of ball bearings in said race formed by said annular grooves, and a plurality of roller bearings radially disposed about said axis between said axially facing planar surfaces and maintaining said bearing members spaced with said grooves in ball bearing retaining relationship, said one member being formed to be shiftable in said skirt to move said portion of said one side wall of said groove relative to the corresponding side wall of the second mentioned groove a distance to form an opening for insertion of said ball bearings individually through the open end of said skirt and into the space between said grooves.

3. In a combination ball roller bearing two bearing members having a common axis, one member having a circular section the center of which coincides with said common axis and an axially facing planar surface disposed normal to said axis, an annular circumferential groove about said circular section and lying in a plane normal to said axis, a portion of said one member adjacent the side of the circumferential groove remote from said planar surface having a lesser diameter than the diameter of the opposite side of said groove, said other bearing member having an axially facing planar surface disposed normal to said axis and facing the first mentioned planar surface to cooperate therewith and form a roller bearing race, said other bearing member having an open end skirt portion integral therewith and surrounding said circular section of said one member and spaced radially therefrom, said skirt having an annular groove on the interior thereof and lying in a plane normal to said axis and adapted to cooperate with said first mentioned annular groove in said circular section to form a ball bearing race, the diameter of said one section being less than the inside diameter of said skirt whereby said circular section may be inserted into said skirt for forming said roller and ball bearing races, a plurality of ball bearings in said ball bearing radially formed by said annular grooves, and a plurality of roller bearings radially disposed about said axis and between said axially facing planar surfaces, said roller bearing maintaining said bearing members spaced with said grooves in ball bearing retaining relationship, said one bearing member being formed to be shiftable in said skirt to move said one side wall of said groove relative to the corresponding side wall of the second mentioned groove a distance to form an opening for insertion of said ball bearings through the open end of said skirt and into the space between said grooves.

4. A combination ball and roller bearing, two bearing members having a common axis, one member having a circular section the center of which coincides with said common axis and an axially facing planar surface disposed normal to said axis, said circular section including an annular circumferential groove thereabout and lying in a plane normal to said axis said other bearing member having an axially facing planar surface disposed normal to said axis and facing the first-mentioned planar surface to cooperate therewith and form a roller bearing race, an open end skirt portion surrounding said circular section and spaced radially therefrom, and an annular groove on the interior of said skirt portion and lying in a plane normal to said axis and cooperating with said first mentioned annular groove to form a ball bearing raceway, a plurality of ball bearings assembled in a ball bearing cage in said ball bearing raceway formed by said annular grooves, a plurality of roller bearings radially disposed about said axis and between said axially facing planar surface, the portion of the circular section of said one member forming the side wall of the circumferential groove or ball bearing race therein farthest from said planar surface being relieved or of less diameter than the diameter of the opposite side wall whereby said ball bearings assembled in their cage may be inserted between the last-mentioned side walls of said groove when said members are displaced axially relative to one another before said roller bearings are assembled between said planar surfaces.

5. A combination ball and roller bearing, two concentric ring-like bearing members having a common axis, one member having a circular section the center of which coincides with said common axis, an axially facing planar surface disposed normal to said axis and an annular circumferential groove thereabout and lying in a plane normal to said axis, said other bearing member having an axially facing planar surface, a skirt portion surrounding said circular section and spaced radially therefrom, an annular groove on the interior of said skirt portion and lying in a plane normal to said axis and cooperating with said first-mentioned annular groove to form a ball bearing raceway when said members are in given relative position, said one member being formed to be shiftable in said skirt to move said members out of said given relative position, a plurality of ball bearings assembled in a ball bearing case and disposed in said ball bearing raceway, and a plurality of roller bearings radially disposed about said axis and between said axially facing planar surfaces, at least a portion of one side wall of said circumferential groove in said one member farthest from said planar surface being relieved so that when said members are shifted out of said given relative position said ball bearings may be inserted through the opening between the hedges of said relieved portion of said side wall of the wall of said groove and the walls of the other of said grooves.

6. A method of manufacturing a combination ball and roller bearing comprising two cylindrical members one rotatable relative to the other about a common axis, one member having an axially facing surface extending normal to said axis and a skirt portion extending axially of said surface and surrounding side walls of the other member, the other of said members having an axially facing surface normal to said axis and facing the first-mentioned surface, the sides of said other member having an annular ball race groove thereabout in a plane normal to said axis and the inside of said skirt of said one member having an annular groove thereabout in a plane normal to said axis and opposite the first-mentioned groove, said grooves cooperating to form a ball race, said one member having central axial opening, the method which comprises placing said other member within said skirt of said one member with the axial surfaces thereof in close confronting coaxial alignment, placing a plurality of balls in the space between said skirt and the sides of radially spaced said other member, raising said other member to bring said grooves into position to confine said balls between said grooves, and then inserting rollers through said central opening and positioning them radially between said coaxially aligned annular surfaces.

7. A method of manufacturing a combination ball and roller bearing comprising two cylindrical members, one member having an axially facing planar surface and a skirt portion extending axially of said annular surface and surrounding the other member, the other of said members having an axially facing planar surface facing said planar surface of said one member, the periphery of said other member having an annular ball race groove thereabout and the inside of said skirt of said one member having an annular groove facing the first-mentioned groove, said grooves cooperating to form a ball race, one of said members having an annular surface sloping away from the edge of the annular groove therein remote from the planar surface thereof and away from the adjacent side of the other member for facing a ball receiving space, the method which comprises placing a plurality of radially disposed rollers on said planar surface of said one member, placing the other member on said rollers with the planar surface resting on said rollers and within the skirt of said one member with one side thereof adjacent one side of said skirt to form a space at the opposite side thereof for receiving balls between said member and skirt, and inserting a plurality of balls in said space between said members.

8. In a combination ball and roller bearing comprising two ring-like bearing members at least three feet in diameter and one being arranged to rotate relative to the other about a common axis, one member having a circular section the center of which coincides with said common axis, an annular circumferential groove or ball bearing race about said circular section lying in a plane normal to said axis, said circular section having an axially facing planar surface disposed normal to said axis, said other bearing member having an axially facing planar surface disposed normal to said axis and facing the first-mentioned planar surface and a skirt portion formed integral therewith and surrounding said circular section and spaced radially therefrom, said skirt portion having an annular groove or ball bearing race about the interior thereof and lying in a plane normal to said axis, means for inserting a plurality of ball bearings in said annular grooves and a plurality of roller bearings between said axially facing planar surfaces when the circular section is mounted within the skirt portion.

References Cited

UNITED STATES PATENTS

| 1,059,538 | 4/1913 | Hess | 308—198 |
| 2,248,590 | 7/1941 | Smith | 308—227 |
| 3,258,301 | 6/1966 | Porvatov | 308—227 |

FOREIGN PATENTS

| 111,716 | 10/1940 | Australia. |
| 497,204 | 9/1919 | France. |
| 18,607 | of 1909 | Great Britain. |

MARTIN P. SCHWADRON, *Primary Examiner.*

FRANK SUSKO, *Examiner.*